(12) United States Patent
Teran et al.

(10) Patent No.: US 6,599,424 B1
(45) Date of Patent: Jul. 29, 2003

(54) METHOD FOR LAGOON REMEDIATION

(75) Inventors: Alfredo J. Teran, Cape Canaveral, FL (US); Richard G. Wood, Merritt Island, FL (US); Nidal A. Samad, Merritt Island, FL (US); Wesley Todd Willoughby, Merritt Island, FL (US); John R. Derrick, Jr., Rockledge, FL (US)

(73) Assignee: Agrimond, LLC

( * ) Notice: Subject to any disclaimer, the term of this patent is extended or adjusted under 35 U.S.C. 154(b) by 0 days.

(21) Appl. No.: 10/063,503

(22) Filed: May 1, 2002

Related U.S. Application Data

(62) Division of application No. 09/504,675, filed on Feb. 15, 2000, now Pat. No. 6,395,174, which is a continuation-in-part of application No. 09/250,828, filed on Feb. 17, 1999, now Pat. No. 6,193,889, which is a continuation of application No. 09/167,275, filed on Oct. 6, 1998, now Pat. No. 6,039,874.

(60) Provisional application No. 60/120,243, filed on Feb. 16, 1999, provisional application No. 60/079,360, filed on Mar. 25, 1998, provisional application No. 60/070,709, filed on Jan. 7, 1998, provisional application No. 60/070,410, filed on Jan. 5, 1998, and provisional application No. 60/061,397, filed on Oct. 1, 1997.

(51) Int. Cl.⁷ .................................................... C02F 3/02
(52) U.S. Cl. ...................... 210/609; 210/610; 210/620; 210/631; 210/747
(58) Field of Search ................................ 210/609, 610, 210/611, 620, 631, 747

(56) References Cited

U.S. PATENT DOCUMENTS

| 3,429,806 A | * | 2/1969 | Curter et al. ............... 210/621 |
| 3,701,727 A | * | 10/1972 | Kormnnik ................... 210/605 |
| 3,966,450 A | | 6/1976 | O'Neill et al. |

(List continued on next page.)

OTHER PUBLICATIONS

Eckenfelder J., "Principles of Water Quality, Mangement" pp. 135, 355, 545–546, 591,639, 1980.*

(List continued on next page.)

Primary Examiner—Christopher Upton
(74) Attorney, Agent, or Firm—Anton J. Hopen; Smith & Hopen, P.A.

(57) ABSTRACT

The present invention is drawn to a unique method for treating anaerobic bodies of water including, but not limited to, agricultural waste treatment lagoons. The treatment method of the present invention includes the steps of analyzing the characteristics of the wastewater and sludge to be treated in an animal wastewater lagoon, identifying and propagating beneficial aerobic bacteria such that a selective dominance of the beneficial aerobic bacteria may be established in the animal wastewater lagoon, sizing an aeration means according to the quantity of water to be treated, aerating the animal wastewater lagoon and aerobically treating the wastewater in the animal wastewater lagoon further comprises propagated aerobic bacteria selected to aerobically digest organic material, and clarifying the wastewater by injected the aerobically treated wastewater with a polymer.

3 Claims, 3 Drawing Sheets

U.S. PATENT DOCUMENTS

| | | | |
|---|---|---|---|
| 4,029,575 A | * | 6/1977 | Bykowski et al. .......... 210/605 |
| 4,045,522 A | | 8/1977 | Nafziger |
| 4,137,158 A | | 1/1979 | Ishida et al. |
| 4,177,575 A | | 12/1979 | Brooks |
| 4,183,807 A | | 1/1980 | Yoshizawa et al. |
| 4,220,723 A | | 9/1980 | Eckmayer et al. |
| 4,338,337 A | * | 7/1982 | Frankl ........................ 210/622 |
| 4,348,285 A | | 9/1982 | Groeneweg et al. |
| 4,432,869 A | | 2/1984 | Groeneweg et al. |
| 4,592,275 A | | 6/1986 | Frankl |
| 4,721,569 A | | 1/1988 | Northrop |
| 4,772,307 A | | 9/1988 | Kiss et al. |
| 4,824,563 A | * | 4/1989 | Iwahori et al. ............. 210/605 |
| 5,062,387 A | | 11/1991 | Anderson |
| 5,078,882 A | | 1/1992 | Northrop |
| 5,135,659 A | | 8/1992 | Wartanessian |
| 5,171,687 A | * | 12/1992 | Moller et al. ............... 210/610 |
| 5,200,082 A | | 4/1993 | Olsen et al. |
| 5,282,879 A | | 2/1994 | Baccarani |
| 5,470,476 A | | 11/1995 | Taboga |
| 5,472,472 A | | 12/1995 | Northrop |
| 5,525,239 A | | 6/1996 | Duske |
| 5,538,529 A | | 7/1996 | Northrop |
| 5,545,325 A | * | 8/1996 | Hsu et al. ................... 210/605 |
| 5,545,560 A | | 8/1996 | Chang |
| 5,622,630 A | | 4/1997 | Romano |
| 5,626,644 A | | 5/1997 | Northrop |
| 5,627,069 A | | 5/1997 | Powlen |
| 5,840,182 A | * | 11/1998 | Lucido et al. ............... 210/610 |
| 6,207,056 B1 | * | 3/2001 | Lucido et al. ............... 210/610 |
| 6,207,057 B1 | * | 3/2001 | White ........................ 210/620 |
| 6,254,776 B1 | * | 7/2001 | Seagle ........................ 210/620 |

OTHER PUBLICATIONS

Steel & McGhee "Water Supply and Seweringe" pp. 282–283, 438–460, 538–520, 535–536, 1979.*

Stith, Pat and Warrick, Joby, "Boss Hog: North Carolina's pork revolution," The News & Observer, Feb. 19–26–, 1995, pp. 1–3.

Stith, Pat and Warrick, Joby, "New studies show that lagoons are leaking," the News & Observer, Feb. 19, 1995, pp. 1–8.

Stith, Pat and Warrick, Joby, "Lacking staff, DEM finds it hard to challenge status quo," The News & Observer, Feb. 19, 1995, pp. 1–3.

Stith, Pat and Warrick, Joby, "Law restricts hog information, even from N.C. officials," The News & Observer, Feb. 19, 1995, pp. 1–3.

Stith, Pat and Warrick, Joby, "Corporate takeovers," The News & Observer, Feb. 21, 1995, pp. 1–6.

Sith, Pat and Warrick, Joby, "For Murphy, good government means good business," The News & Observer, Feb. 22, 1995, pp. 1–6.

Stith, Pat and Warrick, Joby, "The smell of money," The News & Observer, Feb. 25, 1995, pp. 1–5.

Stith, Pat and Warrick, Joby, "Who's in charge?", The News & Observer, Feb. 26, 1995, pp. 1–6.

Stith, Pat and Warrick, Joby, "Boss Hog: Information Sources," The News & Observer, pp. 1–6.

Policy recommedations for Management of Agricultural Animal Waste Task Force, Nicholas School of the Enivronment, Apr. 1996, pp. 1–2.

"Pork Powerhouses 1996", Successful Farming, SF Pork Powerhouses, Oct. 1996, pp. 1–5.

Seth Effron, Editor, "You Don't Say", The Insider, Jun. 3, 1996, vol. 4, No. 108, (5 pages).

Knight, Bill, "Megafarms", Apr. 17, 1997, pp. 1–2.

Stith, Pat and Warrick, Joby, "Midwest farmers fear N.C.–style expansion", THe News & Observer, Feb. 21, 1995, pp. 1–6.

Associated Press "Siegrist expects special session", The Iowa Legislative Report, Apr. 19, 1997, p. 1.

Sullivan, Ken, "Debate over hog farm issues", The Iowa Legislative Report, Apr. 24, 1997, p. 1.

Boshart, Rod, "2 ag issues left hanging", The Iowa Legislative Report, Apr. 30, 1997, pp. 1–2.

Boshart, Rod, "Hot lot issues linger", The Iowa Legislative Report, May 1, 1997, pp. 1–2.

"Agriculture: Successful Farming", Pork Powerhouses, p. 1.

Levine, Adam, "Overwhelming Majority Passes Hog Farm Bill", Missour Digital News, May 16, 1996, p. 1.

"Welcome to Circle Four Farms", Circle 2 Farms (5 pages).

"C.O.W. spells success for Murphy Family Farms", Jan. 18, 1997, p. 1.

Wagner, John, "Hayes issues aggressive plan for addressing hog–farm problems", The News & Observer, Feb. 16, 1995, pp. 1–2.

General Assembly of North Carolina, Session 1997, House Bill 85, "Environmentally Sound Policy Act", Feb. 10, 1997, pp. 1–7.

Gneral Assembly of North Carolina, Session 1997, House Bill 307, "Environmentally Sound Policy Act", Feb. 24, 1997, pp. 1–7.

General Assembly of North Carolina, Session 1997, House Bill 515, "Environmentally Sound Policy Act", Mar. 13, 1997, pp. 1–8.

General Assembly of North Carolina, Session 1997, House Bill 238, "Facilitate Animal Waste Mgt. Research", Feb. 17, 1997, pp. 1–2.

General Assembly of North Carolina, Session 1997, House Bill 357, "General Animal Waste Permits", Feb. 27, 1997, pp. 1–2.

General Assembly of North Carolina, Session 1997, Senate Bill 478, "Amend Swine Farm Laws", Mar. 25, 1997, pp. 1–6.

General Assembly of North Carolina, Session 1997, House Bill 944, "Zoning/Siting Swine Farms", Apr. 15, 1997, pp. 1–4.

General Assembly of North Carolina, Session 1997, House Bill 974, "Improve Animal Waste Management", Apr. 16, 1997, pp. 1–4.

General Assembly of North Carolina, Session 1997, Senate Bill 1043, "Comprehensive Water Quality Management", Apr. 21, 1997, pp. 1–5/.

Neff, Joseph and Leavenworth, Stuart, "Builders big losers in moratorium", The News & Observer, Apr. 9, 1997, pp. 1–3.

Editorial: The best hog plan, The News & Observer, Apr. 9, 1997, pp. 1–2.

Wagner, John, "Hunt to back hog ban", The News & Observer, Apr. 8, 1997, pp. 1–3.

Patterson, Dennis, "Farmers gather at legislature to protest hog regulations", The News & Observer, Mar. 27, 1997, pp. 1–2.

Rawlins, Wade, "Tension growing over hog rules", The News & Observer, Apr. 3, 1997, pp. 1–3.

Editiorial: Eye on the hog plan, The News & Observer, Apr. 16, 1997, pp. 1–2.

Neff, Joseph, "Effort to curb hogs stays alive in House committee", The News & Observer, Mar. 20, 1997, pp. 1–3.

Neff, Joseph, "House leaders seek new hog–farm curbs", The News & Observer, Mar. 13, 1997, pp. 1–2.

Leavenworth, Stuart, "Hog farm debate draws crwod to legislature", The News & Observer, Mar. 6, 1997, pp. 1–3.

Allegood, Jerry, "Craven halts hog farm permits for year", The News & Observer, Feb. 26, 1997, pp. 1–2.

Neff, Joseph, "Hog debate focuses on zoning", The New & Observer, Apr. 15, 1997, pp. 1–3.

Neff, Joseph, "House passes curbs on hog farms", The News & Observer, Apr. 30, 1997, pp. 1–3.

Heath, Jena, "Copies of report on suggested hot–farm laws are getting scarce", The News & Observer, May 27, 1997, p. 1.

"Dome: governor waffles on hog curbs", The News & Observer, Apr. 2, 1997, pp. 1–2.

Associated Press, "Activists push for strict rules on livestock farms", The News & Observer, May 17, 1996, pp. 1–2.

Editorial: Senate menu: pork, The News & Observer, May 2, 1997, pp. 1–2.

Letter: Rogers' quaint delusions about N.C. farming, The News & Observer, Apr. 16, 1997, pp. 1–2.

Neff, Joseph, "Once mired in committee, a hog bill takes wings", The News & Observer, Mar. 21, 1997, pp. 1–3.

General Assembly of North Carolina, Session 1995, Senate Bill 695, "Agriculture Waste Commission", Apr. 13, 1995, pp. 1–3.

General Assembly of North Carolina, Session 1995, Senate Bill 1345, "Animal Waste Permits/Inspections", May 27, 1996, pp. 1–5.

General Assembly of North Carolina, Sesson 1995 House bill 524, "Agriculture Waste Commission", Mar. 22, 1995, pp. 1–3.

General Assembly of North Carolina, Session 1995, House Bill 1293, "Bladen CC Swine Funds", May 22, 1996, p. 1.

"A short history of hogs in North Carolina", The News & Observer, Apr. 15, 1997, p. 1.

Seth Effron, Editor, "You Don't Say", The Insider, May 27, 1996, vol. 4, No. 103, (5 pages).

Rose, James, "Irked Valentine wants hog panel to get to work", The News & Observer, Jan. 19, 1996, pp. 1–3.

* cited by examiner

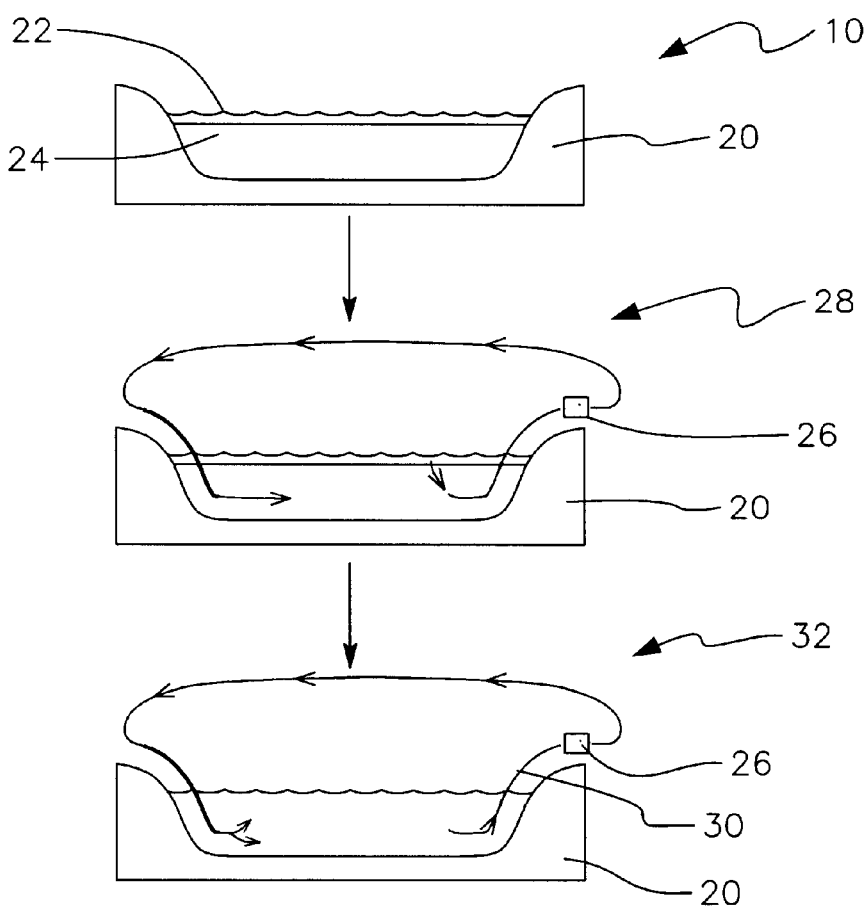
FIG. 2
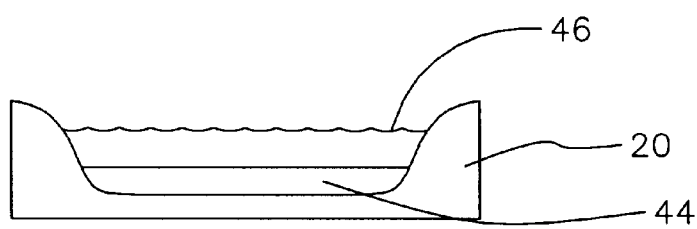
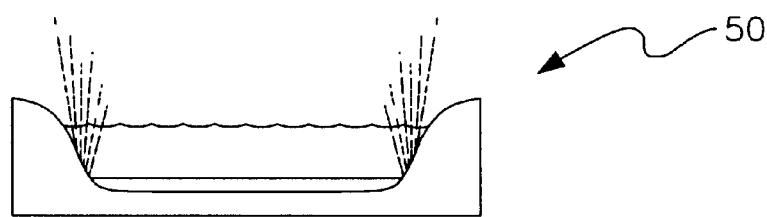

METHOD FOR LAGOON REMEDIATION

CROSS-REFERENCE TO RELATED APPLICATION

This application which is incorporated herein by reference is a divisional of and claims the benefit of U.S. application Ser. No. 09/504,675 filed Feb. 15, 2000, now U.S. Pat. No. 6,395,177. Additionally, U.S application Ser. No. 09/504,675 claims the benefit and is a continuation-in-part of U.S. application Ser. No. 09/250,828 filed Feb. 17, 1999, now U.S. Pat. No. 6,193,889, which claims the benefit and is a continuation of U.S. application Ser. No. 09/167,275 filed Oct. 6, 1998, now U.S. Pat. No. 6,039,874. U.S. application Ser. No. 09/167,275 claims the benefit of U.S. Provisional Application No. 60/061,397, filed on Oct. 7, 1997; U.S. Provisional Application No. 60/070,410 filed on Jan. 5, 1998; U.S. Provisional Application No. 60/070,709 filed on Jan. 7, 1998; and U.S. Provisional Application No. 60/079,360 filed Mar. 25, 1998. The disclosures of Provisional Application No. 60/120,243, filed Feb. 16, 1999, U.S. application Ser. No. 09/250,828 and U.S. application Ser. No. 09/167,275 and of the provisional applications are incorporated herein by reference.

BACKGROUND OF THE INVENTION

This invention relates to a method for the treatment of anaerobic bodies of water and, more particularly, to a method for treatment of agricultural waste such as may be found in an anaerobic waste lagoon.

Over the past decades there has been a shift from smaller localized family farms toward larger integrated confinement agricultural operations. Specifically, large agricultural operations referred to as concentrated animal feeding operations (CAFO's) may utilize confinement barns to house a large number of livestock such as swine, poultry or dairy cows. Using the swine industry as an example, often numerous hog-confinement operations are grouped in close proximity forming "mega-farms" which may house tends of thousands of hogs. Similarly, the dairy industry operates using large factory farms that house thousands of animals in a relatively small land area. While these larger agricultural operations have numerous advantages, attendant with these larger facilities are pollution problems relating to the handling and treatment of manure and wastewater (hereinafter collectively "wastewater"). By way of example, pollution problems associated with liquid animal waste, such as produced by the swine industry, include nitrogen, phosphorus, solids, bacteria and foul odors that result from anaerobic digestion. Environmental concerns more specifically center on odor and ground and surface water quality issue and impacts.

Traditionally, animal wastes and wastewater is collected and stored in waste treatment lagoons or waste storage ponds where it undergoes minimal treatment. Most agricultural facilities use anaerobic digestion for treatment of animal wastes and wastewater. The primary reasons for using anaerobic digestion is simplicity and cost. Wastewater is simply discharged from the animal storage facility into an open lagoon or plurality of lagoons (ponds used to store and treat thousands to millions of gallons of animal waste) where the waste undergoes natural anaerobic digestion. After retention in the lagoon system, wastewater is usually land applied via spray irrigation. However, over forty (40) noxious gases may be emitted from anaerobic lagoons at hog and/or dairy farms including ammonia, methane and hydrogen sulfide. Additionally, the time required for digestion of the organic wastes is relatively long, from weeks to months. Some current regulations require a minimum residence of 180 days for animal waste facilities using anaerobic lagoons for digestion. Neighbors find odors emanating from lagoons, confinement houses, and fields onto which wastes are sprayed to be a nuisance. In fact, as a result of odor problems associated with anaerobic lagoons, certain states have legally mandated buffer zones or designated land areas between lagoon sites and populated areas.

Oftentimes, the reduction of organics and nutrients within an anaerobic lagoon is minimal and therefore high quantities of nitrogen, phosphorus, etc., are applied to the land during spray irrigation. These nutrients readily build up high residual concentrations in the soil, leach directly into the groundwater, or run-off into surface waters causing algal booms, oxygen deficiencies and fish kills.

New studies have also shown that lagoons are leaking and there have been pollution problems with the groundwater, rivers, lakes, and coastal waters primarily in states where the high concentrations of hog or other farms are located. Another problem attendant with traditional anaerobic settling lagoons is that occasionally the water overflows the lagoons or the earthen containment berms collapse, primarily during periods of heavy rainfall, and the wastewater runs off into streams, rivers, and lakes, causing severe pollution problems. When wastewater escapes from these lagoons, either resulting from overflows or other failures, the high concentration of pollutants has adverse effects on the receiving waters and commonly results in groundwater contamination and massive fish and other aquatic life kills.

The most critical problem in the recent past has been with the microorganism *Pfiesteria piscicida*. *Pfiesteria piscicida* is a dinoflagellates that cause "red tides". This bacterium has the ability to take on up to twenty-four (24) different forms during its life cycle and can attack and kill fish within hours. Recent outbreaks of *Pfiesteria piscicida* could be attributed to the increase in nutrients in the water or to the weakening of the fish due to stress caused by lack of oxygen and/or elevated ammonium levels, among other factors.

By way of example, hog anaerobic lagoon liquid has nutrient characteristics including high levels of biochemical oxygen demand ($BOD_5$), Total Nitrogen (TN) and Phosphorus that cannot be decreased to acceptable levels by anaerobic treatment alone.

Even with bacterial digestion within an anaerobic lagoon, significant amounts of sludge accumulate in an anaerobic lagoon. Anaerobic lagoons commonly fill to capacity fairly quickly which displaces the designed retention capacity of the lagoon in a short period of time. Anaerobically digested sludge is not suitable for commercial use or land application at typical loading rates in the anaerobically digested state.

Hogs produce two to four times as much waste, per hog, as the average human and in North Carolina alone, hogs produce about 9.5 million tons of manure a year. Additionally, dairy cows produce up to twenty times as much waste, per cow, as the average human. Therefore, a great deal of land is required for spreading the highly concentrated waste since often no discharge is permitted from animal waste facilities. Farmers who specialize in raising large quantities of animals are forced by regulations to use larger and larger areas of land in which to spread the large quantities of wastes generated from higher numbers of animals. This has, and will continue, a trend toward having to sacrifice more land to simply dispose of the waste. The land utilized for land spreading of waste cannot be just any land, but must be carefully selected or altered so as to prevent any rainfall runoff discharging into any surface waters. The land must be planted with species capable of tolerating high nitrogen and high phosphorus containing wastes. The farming industry is running out of places to spread or spray the waste from lagoons.

While efforts are being made to regulate new farm facility construction, abandoned waste lagoons are still prevalent. By way of example, North Carolina has an estimated seven hundred abandoned lagoons.

Continuing efforts are being made to improve agricultural and animal waste treatment methods. By way of example, note U.S. Pat. No. 5,472,472 to Northrop and U.S. Pat. No. 5,078,882 to Northrop. U.S. Pat. No. 5,472,472, discloses a process for the transformation of animal waste wherein solids are precipitated in a solids reactor, the treated slurry is passed to a bioreactor zone where soluble phosphorus is precipitated with metallic salts, the slurry is aerobically and anaerobically treated to form an active biomass. The aqueous slurry containing bioconverted phosphorus is passed into a polishing ecoreactor zone wherein at least a portion of the slurry is converted to a beneficial humus material. In operation, the system requires numerous chemical feeds and a series of wetland cells comprising microorganisms, animals and plants. See also U.S. Pat. No. 4,348,285 and U.S. Pat. No. 4,432,869 to Groeneweg et al.; U.S. Pat. No. 5,627,069 to Powlen; U.S. Pat. No. U.S. Pat. No. 5,135,659 to Wartanessian; and U.S. Pat. No. 5,200,082 to Olsen et al. (relating to pesticide residues); U.S. Pat. No. 5,470,476 to Taboga; and U.S. Pat. No. 5,545,560 to Chang.

Another grouping of background patents are those which disclose methods of treating wastewater rich in nutrients. Note U.S. Pat. No. 5,626,644 to Northrop; U.S. Pat. No. 4,183,807 to Yoshizawa et al.

Another grouping of background patents are those which disclose methods of producing humus material or spreadable fertilizer from animal waste. By way of example see U.S. Pat. No. 5,538,529 to Northrop; U.S. Pat. No. 5,525,239 to Duske; and U.S. Pat. No. 5,282,879 to Baccarani.

The disclosures of the documents submitted as part of the Information Disclosure Statements previously filed with U.S. application Ser. No. 09/250,828 and U.S. application Ser. No. 09/167,275 are incorporated by reference in the entirety.

Not withstanding the existence of such prior art treatment systems, it remains clear there is a need for a method for the treatment of anaerobic bodies of water that can be utilized to treat animal waste lagoons in an economical environmentally friendly fashion.

Efforts to improve the methods to treat anaerobic bodies of water, specifically animal waste treatment lagoons, continues. Accordingly, it is an object of the present invention to provide and improvement that overcomes inadequacies of the prior art method and provides an improvement, which is a significant contribution to the advancement of the art.

Another object of this invention is to provide a new and improved system for treatment of anaerobic bodies of waste and wastewater that has all the advantages and none of the disadvantages of the prior art.

A further object of the present invention is to provide a system to treat animal waste lagoons having a minimal impact on the environment.

Another object of the invention is to provide an approved treatment method that significantly reduces the amount of nutrient loading in the treated anaerobic water.

Another object of the invention is to provide a method of treating agricultural wastewater whereby minimal or no land application is required.

Another object of the invention is to provide and effective treatment of the wastewater using methods that will greatly reduce, if not eliminate, the foul odors associated with anaerobic lagoons.

Another object of the invention is to treat wastewater without greatly reducing the nutrients present in any recovered sludge.

Another object of the invention is to provide a system for the purification of agricultural wastewater that is economically feasible.

Another object of the invention is to provide a method for treatment of agricultural waste, which meets regulatory compliance.

Another object of the invention is to provide a nutrient rich organic fertilizer as a by-product of the treatment method of the present invention.

Another object of the invention is to enable the conversion of an anaerobic wastewater lagoon to a freshwater pond.

The foregoing has outline some of the pertinent objects of the invention. These objects should be construed to merely be illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF INVENTION

For the purposes of summarizing the invention, the present invention is drawn to a unique method for treating anaerobic bodies of water or an isolated body of wastewater including, but not limited to, agricultural waste treatment lagoons. Hereinafter, the term "wastewater" will be used to refer to either agricultural waste or organic rich water that may be subject to treatment utilizing the method of the present invention and any constituent sludge. The method of the present invention may be readily configured depending upon the amount and constituents of the wastewater and sludge to be treated. In a preferred embodiment, typical of that which may be utilized to treat an existing animal wastewater treatment lagoon, the treatment method of the present invention will consist of several phases once the parameters of the wastewater have been ascertained. First, specially selected bacteria are cultivated based upon the wastewater parameters. This specialized bacteria is then utilized in bio-augmentation of the wastewater lagoon. Specifically, bacteria will be isolated and propagated specific for the wastewater and once introduced, will create a selective dominance within the lagoon and enhance digestion of the waste. The wastewater lagoon is equipped with an aeration means and mixing means such that the wastewater undergoes aerobic digestion utilizing the specially selected bacteria. Both the water and sludge are mixed and aerated while the added bacteria, cultured specifically to digest the constituents particular to the body of water, speed up the treatment. The aerobic treatment in the lagoon serves to break down organics and oxidize both macro- and micronutrients resulting in the reduction of $BOD_5$, COD, TKN, and ammonium-nitrogen. Preferably, the lagoon incorporates an energy efficient aeration/circulation system to promote mixing and oxygenation.

The solids separation or clarification phase preferably occurs in the existing animal wastewater treatment lagoon. However, if the wastewater treatment lagoon is large or there in a significant amount of solids, in a second embodiment aerobically treated wastewater may be removed and clarification may occur in the aboveground tanks. As used herein, solids separation or "clarification" will refer broadly to flocculation, coagulation and sedimentation. The clarification process will be facilitated through the addition of the polymer.

Depending upon the size of the anaerobic body of water, digested sludge that has undergone aerobic treatment and clarification may then undergo dewatering. Since it is an aerobic not anaerobic sludge, odor should be greatly reduced or eliminated. The nutrient rich accumulated dewatered sludge may be deactivated for use as solid fertilizer while the resultant water is capable of supporting an ecosystem.

In an alternative or third embodiment, the foregoing methodology may be applied towards anaerobic bodies of water such as may be found in a dead-end canal. Specifically, navigable waterways such as canals, creeks, streams and even rivers, at times must undergo periodic dredging due to the build up of sludge and silt. The sludge and silt build up is typically due to the accumulation of organic material and the consistency varies from one location to the other. In the third embodiment, specially propagated bacteria are added to the sludge prior at any dredging operation occurring. The area to be dredged may be isolated, aerated and mixed to support the aerobic bacteria. After testing to determine that organics have been removed, the aerobic sludge will then be pumped from the dredge site where it will undergo clarification with the resulting removed sludge being transported to a disposal location. The resultant clarified water would be removed to spoil the area. By utilizing the method of the present invention, small bodies of water, ie. Anaerobic animal waste treatment lagoons, can be treated in situ with aeration, bacteria and mixing of the sludge. After the mixing and aerobic digestion process using specialized bacteria, the sludge then undergoes solids separation/clarification using a polymer with the sludge being either removed and dewatered or left in place. If removed, the material is suitable for use as a soil enhancer or organic fertilizer. If left in place, the sludge becomes a source of nutrients to support plant growth and the development of an aquatic ecosystem. Large bodies of water can be treated by the removal of the untreated sludge and providing aerobic treatment in a separate vessel. After this treatment, the clarified liquid is returned to the body of water while the treated sludge s allowed to undergo the digestion process and then is dewatered for further processing and use.

The foregoing has outlined rather broadly the more pertinent and important features of the present invention. The detailed description of the invention that follows is offered so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent construction does not depart from the spirit and scope of the invention as set forth in the appended claims.

BRIEF DESCRIPTION OF DRAWINGS

For a fuller understanding of the nature and objects of the invention, reference should be had to the following detailed description taken in connection with the accompanying drawings in which:

FIG. 2 is a diagram illustrating a first embodiment of the present invention;

Similar reference characters refer to similar parts throughout the several views of the drawings.

DETAILED DESCRIPTION

The method of the present invention may be utilized for treatment of any isolated body of wastewater that is predominantly anaerobic or has high organic levels. For ease in description, a preferred embodiment suitable for installation and use with an agricultural wastewater lagoon will be described in detail first.

Agricultural Installation

Broadly speaking, the conventional means of closing an anaerobic animal waste lagoon is to simply to mix the contents of the lagoon, pump out all of the water, dredge out as much sludge as possible and land apply the anaerobic sludge. The lagoon may then be either covered by pushing in the berms, allowed to become a freshwater pond, or modified so that water will not collect in the dredged lagoon. However, the conventional method of closing an animal waste lagoon does not satisfactorily address environmental issue attendant with the dredged anaerobic sludge and there is a great deal of time and cost involved in dredging and land spreading sludge. The hauled material may only be land applied for the use as fertilizer if the waste sludge can be spread over a large enough area to handle the highly concentrated material. The method of the present invention involves converting the anaerobic wastewater lagoon to a freshwater pond capable of sustaining aquatic life. In a first embodiment, the entire treatment method will occur at the site of the animal wastewater lagoon with no sludge or water having to be removed following treatment.

Figure 1:
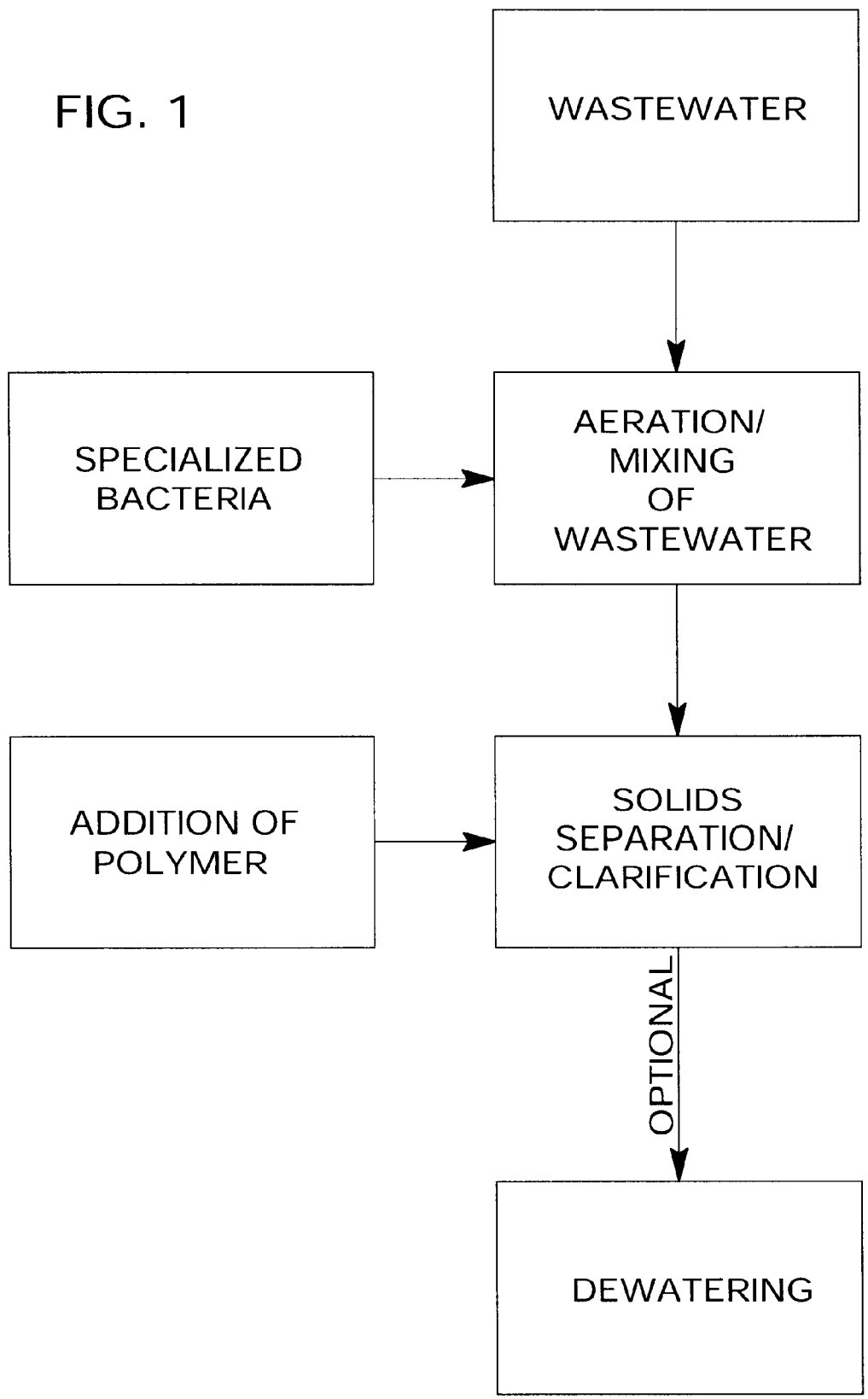
FIG. 1 is a flow diagram illustrating the present invention, including a dewatering phase.
Figure 3:
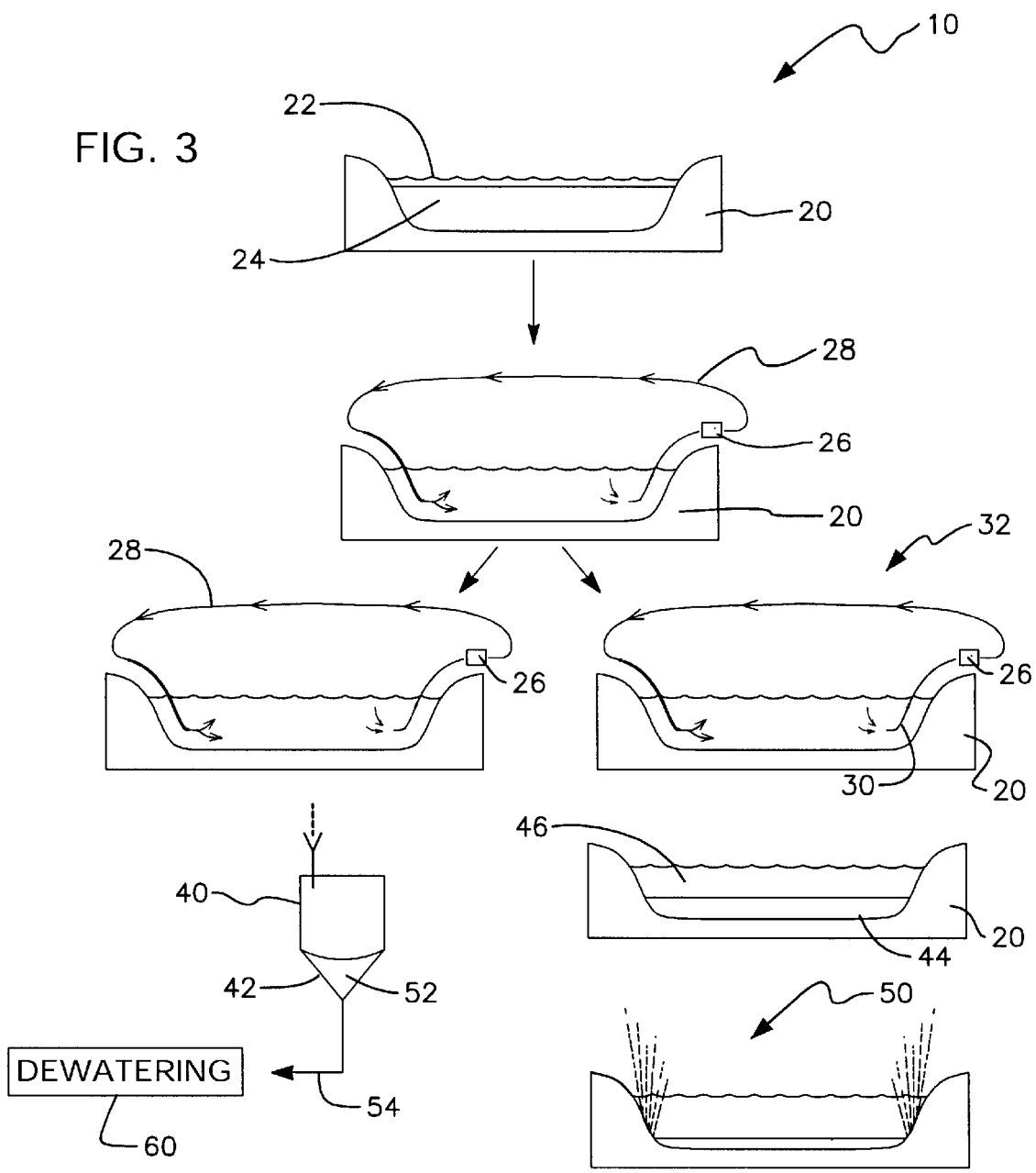
FIG. 3 is a diagram illustrating the first embodiment of the present invention and a second embodiment of the present invention.

With reference to the drawings, and in particular FIGS. 2 and 3 thereof a new and improved wastewater treatment method embodying the principles and concepts of the present invention and generally designated by the reference number 10 will be described.

Each agricultural operation that may have an animal wastewater lagoon, such as where swine or dairy cows are produced and housed, will have different wastewater parameters and water requirements. System design will depend upon the wastewater lagoon size and constituents. These values will be dependent upon the type of far, hog (sow, nursery or finishing), diary cattle or chicken and the number of animals per farm. Additional variables may include the length of time the wastewater has been present in the lagoon. By way of example, the primary pollutant problems associated with hog farms include nitrogen, solids, bacteria and foul odors produced by anaerobic digestion (ammonia, hydrogen sulfide, methane, etc.). A "typical" hog anaerobic lagoon liquid effluent from an agricultural operation housing approximately 9800 finishing hogs may have the nutrient characteristics as listed in the following table:

[t3]

| Parameter | Hog Lagoon Effluent (mg/L) | Raw Municipal Sewage (mg/L) |
|---|---|---|
| $BOD_5$ | 691 | 220 |
| Total Kjeldahl Nitrogen (TKN) | 563 | 30 |
| Phosphorus | 225 | 8 |

The first embodiment of the present invention is based upon a multiphase approach including aerobic treatment with specially selected bacteria in an existing lagoon with mechanical aeration and solids separation/clarification. Depending upon the size of the anaerobic body of water, the aerobically treated sludge may be either removed and dewatered or left in place. It is well within the skill of one in the art to vary the size of individual components and retention times based upon the parameters and amount of the agricultural wastewater.

FIGS. 2 and 3 illustrate constructions in which an existing agricultural wastewater lagoon is fitted for treatment of wastewater. However, based upon the teachings of the present invention, it is within the skill of one in the art to design new installations/constructions in which a custom system is designed for a specific agricultural operation.

The wastewater treatment system 10 of the present invention is installed in a wastewater lagoon 20 that will typically have a liquid layer 22 and a sludge layer 24 (collectively wastewater). The treatment method of the present invention will consist of several stages once the parameters of the anaerobic wastewater have been ascertained. First, specially selected aerobic bacteria are cultivated bases upon the wastewater parameters. The main advantage of aerobic treatment is that bacterial digestion tends to be more complete and occurs more rapidly than in an anaerobic treatment.

Digestion of organic wastes by microorganisms provides a great deal of pollutant reduction. Two forms of microbial digestion are aerobic, with oxygen, and anaerobic, without oxygen. The present invention is designed to emphasize and enhance aerobic digestion within the lagoon versus typical anaerobic digestion for animal wastewater. Utilization of aerobic bacteria increases the rate of digestion and reduction of organic pollutants while eliminating the foul odors (methane, ammonia, hydrogen sulfide, etc.) without the addition of chemicals. Aerobic bacteria require free elemental (dissolved) oxygen.

Samples must be collected and preliminary wastewater and sludge analysis must be performed on the particular body of water to be treated. Bacteria specific for waste material will be cultured for the particular application as a result of bench scale testing (i.e. hog waste takes different bacteria than cow waste). Bench scale testing of the source water will incorporate the same treatment technologies to be used in the full-scale operation and will serve as a reference for sizing components in the large-scale application.

The lagoon 20 is fitted with a pump 26 and aeration means 28 to transform the anaerobic wastewater to an aerobic environment. Any commercially available water pump such as those sold by jacuzzi® and Myers® may be utilized in the present invention. The piping and conduits of the present invention are preferably schedule 80 PVC and range in size from 1 to 12 inches in diameter. Soil and groundwater site constraints as well as the amount of surface area will dictate the amount of aeration and mixing necessary to support the aerobic bacteria. Construction of an appropriately sized and dimensioned aeration and mixing means is within the ability of one skilled in the art.

To maximize and enhance the introduction of oxygen and ensure the continual mixing of the wastewater within the lagoon, a portable mixer or a plurality of aerating means (not shown) may be utilized. The placement of the aeration means 28 may be varied depending upon the size and configuration of the lagoon 20. It should be well understood that any number of aerating means might be configured depending upon the size of the aerobic lagoon. During the initial one to two week digestion period after the propagated bacteria are added to the lagoon (not shown), it is anticipated to introduce an excess amount of oxygen above the $BOD_5$ requirement, which will allow for nitrification to occur concurrently with the $BOD_5$ and convert the lagoon to an aerobic state.

Aeration/mixing pumps will be used to circulate the wastewater within the lagoon while injecting high concentrations of oxygen to support the aerobic bacteria. The preferred retention time is between ten days, preferably fourteen days. Alternative methods of aeration may include pumps, venturi eductors, a blower/diffuser manifold, a blower/air lift manifold or surface aerators. Mixing means alternatives may include pumps and/or air lifts.

A specialized bacterium per se is not required for functioning of the present invention because aerobic species of bacteria occur naturally in animal waste. However, in a preferred embodiment of the present invention, beneficial bacteria are isolated, purified and propagated so that the aerobic lagoon may be seeded with a "slug dose" of the cultured bacteria. The purpose of the slug dose is to bioaugment the lagoon and provide the cultured bacteria selective dominance in the lagoon so it will not have to outcompete other bacteria species for the food and oxygen source, thereby increasing digestion efficiency. The combination of aeration and specialized bacteria results in enhanced bioremediation. It is well within the skill of one in the art to select and propagate appropriate beneficial aerobic bacteria for seeding the lagoon. Continual addition of specialized bacteria is necessary to maintain selective dominance.

Once the propagated bacteria have been added to the aerated lagoon and the wastewater had undergone aerobic digestion for a desired period of time, it is pumped through an uptake conduit 30 by means of pump 26 for secondary treatment including solids separation/clarification. For ease in construction, the same piping and conduits utilized in the aeration means may be utilized in clarification stage. The secondary treatment may occur in either the lagoon 20 or in a plurality of aboveground tanks.

Clarification will refer broadly to flocculation, coagulation and sedimentation. The clarification process will be facilitated through the addition of polymer. Flocculation and sedimentation of solids is a method of water clarification where the particles in the water will agglomerate either through natural attractions or through simulation using processes such as polymer addition, ozonation, mixing and aeration. The aerobic sludge generated as a result will be fluffier, less dense and easier to handle and dewater than anaerobic sludge and the primary benefit is the lack of noxious odors. Sludge accumulation can be increased with the use of polymers for enhancing solids removal utilizing a much smaller area and less settling time versus natural gravity settling. Selective blended polymers are employed which will enhance the value of the resultant sludge by providing macro- or micro-nutrients such as phosphorus, calcium, magnesium, manganese, zinc or iron.

As illustrated in FIG. 2 and partially in FIG. 3, the aeration and mixing of the lagoon 20 is continuous until the secondary clarification stage occurs. As illustrated in FIG. 2, in a first embodiment, the aeration means 28 is suspended thereby allowing settling of the solids. Intermit aeration may occur as necessary. Wastewater is pumped through an uptake conduit 30 by means of a pump 26 and flows through a polymer feed system 32 whereby a polymer is added to the wastewater to precipitate and promote solids separation.

As illustrated in FIG. 3, in the lagoon may undergo continuous aeration via the aeration means 28 with wastewater and sludge being removed via a pump (not shown) and clarification occurring in a settling tanks 40 for suspended solids precipitation. In a preferred embodiment, the conical bottom portion 42 of the conical bottom settling tanks 40 aids in precipitating suspended solids. Depending upon the size of the conical bottom settling tank (s), the wastewater will be retained therein for a period of four to five hours. Prior to entry into the conical bottom settling tank (s), the wastewater flows through a polymer feed system (not shown) whereby a polymer is added to the wastewater to precipitate and promote solids and sedimentation.

The polymer is preferably an organic cationic polymer or "GRAS" (generally regarded as safe) polymer which is approved by the Environmental Protection Agency (EPA) for use in potable water application, such as Agrimond Poly-Clear™, but any similar polymer or flocculant (including but not limited to Ferric sulfate, $Fe_2(SO_4)_3$) sold by chemical manufactures under a variety of trademarks may be utilized. Use of the polymer reduces organic loading on the system and renders the wastewater clear of suspended solids.

Alternative methods of clarification may include, but are not limited to, conventional clarifiers, modified conical bottom settling tanks, screen separators and centrifuges.

As illustrated in FIG. 2, after clarification, the digested sludge 44 settles and the clarified water 46 remains in the lagoon 20. The digested sludge becomes a source of nutrients to support plant growth and development of an aquatic ecosystem. After further sampling and analyzing, and obtaining any necessary state or federal approval, the lagoon will support aquatic life and may be considered an evolved pond 50.

As illustrated in FIG. 3, once the wastewater undergoes solids separation in the settling tanks 40, solids 52 accumulate in the bottom regions of the settling tanks. The sludge accumulated in the settling tanks is continuously drained via a conduit 54 to a dewatering means 60 (not shown). The dewatering means may be a filter press or drying bed or any alternative available for dewatering including, but not limited to, drying blocks, dewatering trailers, belt press or thermal dewatering units. The clarified supernatant from the conical bottom tank is routed back to the treatment basin.

The characteristics of aerobic sludge will differ from anaerobic sludge. Aerobic sludge will be a light colored, fluffy material with very little odor. Anaerobic sludge is a dark colored, thick and pasty material that smells like petroleum and/or any of the previously mentioned noxious gases depending on what is trapped within the pores of the sludge. The dewatered sludge will be relatively high in nutrients and once activated can be used for applications such as soil amendment, fertilizer or top-soil.

The plurality of dewatering means 60 incorporates a drain collection area where the liquid from the dewatered solids/sludge will be routed back into the aerobic lagoon via a gravity flow conduit or via a sump pump. If drying beds are utilized, the drying beds are preferably graded from the influent end to the effluent end to facilitate gravity water drainage. Preferably, an underground drainage system comprising a layer of porous material, such as plastic drying blocks, is constructed under the drying bed (s) with catch basins and piping arranged to collect water for piping. Dried sludge will be removed periodically from the site for use based upon the amount generated on a daily basis.

If the body of water or animal waste lagoon is large, in an alternative approach, untreated sludge and wastewater may be removed and aerobic treatment occur in a separate vessel (such as a tanker truck). After aerobic digestion, the clarified liquid may be returned to the body of water while the treated sludge undergoes continued digestion and dewatering.

Anaerobic Lagoon Sludge Treatment Experiment

Samples of anaerobic lagoon sludge from closed lagoons were tested using aeration and various types of bacteria to determine the reduction in sludge volume. The purpose of this experiment was determine the feasibility of using aeration and specialty propagated bacteria species to consume the sludge, reduce the contaminant loading and eliminate the foul odors present in abandoned hog farm anaerobic lagoons. The five samples tested consisted of:

1 sample+aeration+bacteria type A Prime

2 sample+aeration+bacteria types A, B, C and D

3 sample+aeration

4 sample+aeration+bacteria type E

5 sample only

The samples were aerated continuously for a period of two weeks. Sub-samples were collected daily and allowed to settle to determine the sludge reduction. The following table represents the pertinent results of this experiment.

| Experimental Results | Sample #1 | Sample #2 | Sample #3 | Sample #4 | Sample #5 |
|---|---|---|---|---|---|
| max. solids reduction, % | 7 | 35 | 45 | 61 | 20 |
| settling time, hrs. | 1.5 | 1.5 | 1.5 | 1.5 | 1.5 |
| treatment duration, days | 9 | 10 | 10 | 10 | 10 |

As can be seen from the table, the settling rates using the propagated E bacteria and aeration proved to be the best. These results were consistent for the duration of the experiment irrespective of the settling time or treatment duration.

A cationic polymer was used to precipitate the solids producing excellent results.

Table 1 represents the waste characteristics of the anaerobic waste, both the liquid and sludge (sludge was what was used in the above-mentioned experiment so testing with liquid only would likely yield much better results). Table 2 represents the waste characteristics of the sludge following aeration using E bacteria and solids precipitation using a cationic polymer.

TABLE 1

Raw Waste Characteristics
[t1]

| Waste Characteristics | Sludge Sample | Liquid Sample |
|---|---|---|
| Total Solids | 2,550 | 1,570 |
| Total Phosphorus | 92.5 | 79.2 |
| Total Kjeldahl Nitrogen | 1,440 | 172 |
| Ammonia-Nitrogen | 406 | 139 |
| Biochemical Oxygen Demand | 1,500 | 78.0 |
| Chemical Oxygen Demand | 18,700 | 700 |

Note: All unites are in mg/L unless otherwise noted.

TABLE 2

Treated Waste Characteristics
[t5]

| Waste Characteristics | Sludge Sample | Clarified Sample |
|---|---|---|
| Total Suspended Solids | NA | 5.3 |
| Total Dissolved Solids | NA | 3,660 |
| Total Phosphorus | 3.5 | 2.1 |
| Total Kjeldahl Nitrogen | 1,940 | 109 |
| Ammonia-nitrogen | 114 | 114 |
| Nitrite-Nitrogen | NA | 326 |
| Nitrate-Nitrogen | NA | <0.02 |
| $NO_x$ | 40.1 | 326 |
| Total Organic Carbon | 48.3 | 88.98 |
| Biochemical Oxygen Demand | 706 | <40 |
| Chemical Oxygen Demand | 43,600 | 586 |
| Cadmium | 0.09 | 0.012 |
| Chromium | n.d. | n.d. |
| Copper | 3.62 | 0.036 |
| Lead | n.d | 0.0079 |
| Manganese | 2.16 | 0.042 |
| Zinc | 7.90 | 0.029 |

Note: All units are in mg/L unless otherwise noted.
n.d.: Non-detectable.

The most significant result of this experiment was the fact that the foul anaerobic odor was completely eliminated during treatment. Additionally, the treated sample sat undisturbed in a sealed container for three days and still had no odor at all, indicating a complete conversion to an aerobic.

The solids and heavy metal concentrations present in the clarified supernatant indicated a significant reduction following treatment and polymer addition. The polymer successfully precipitated not only the suspended solids, but also the phosphorus and heavy metals.

In operation, periodic wastewater sampling and analysis will occur to ensure that desired water quality parameters are met at each treatment phase. The present invention allows for rapid digestion of wastewater (a few weeks versus a minimum of six months). The only by-product is aerobically digested and separated sludge, which can be incorporated into a commercial organic fertilizer. Significant reduction of nutrients in both liquid and solids allows for land application at agronomic rates. Lastly, the treated lagoon is available as an environmentally friendly habitat for further use such as recreational activities or fish hatchery.

Anaerobic Body of Water Installation

Over the years, navigable waterways (canals, creeks, streams and rivers) in Florida and other states have had to have periodic dredging due to the build up of sludge and silt. Sludge and silt build-up is typically due to the accumulation of organic material and consistency varies from one location to the other. The current methodology for removal of this silt is by use of a dredge. This requires locating a spoil area at a location convenient to the dredging operation. However, spoil areas are getting harder and harder to obtain as the area around navigable waterways become more urban. As a result, few centralized locations may be used for spoil areas thereby requiring the piping of dredged materials long distances from the dredging operations to the remote spoil area, which requires a great deal of pumping and mobilization. Additionally, the dredging operation (moving the silt and sludge material) must pump a great deal of water. This material and water mix is then pumped through the pipeline to the spoil site where the sludge may be precipitated out through the use of polymer. The clarified water is then returned back to the waterway.

On occasions, the dredge pumping operations will fill up the spoil are with water and sludge and pumping must be stopped to let the solids settle out and the water drain away to provide room for additional pumping. So, on occasion, the dredge will operate for four to six hours a day and allow the rest of the time period for settling. When the dredging operation is complete, the spoil contains both sand and sludge mixed which is then left to dry to an extended period of time, as much as thirty days is a common time period. At this point in time, the material is then trucked to an appropriate landfill or possibly reused as a mix for fertilizer or nutrient land applications.

In a third embodiment of the present invention, specially propagated bacteria may be added to the organic sludge mix prior to any dredging operation taking place. Again, testing of the parameters of the sludge would be necessary since sludge makeup will vary from location to location. In practice, the area to be dredged would be isolated and aerated and mixed to support the aerobic bacteria. Aeration and mixing of the organic sludge with the bacteria would continue until the organics have been consumed, which could readily be confirmed through the use of analysis of dissolved oxygen and BOD analysis of the material. After it has been determined that the organics have been consumed, the digested sludge is then pumped from the dredge site to a clarifying means where it would undergo clarification facilitated through use of a polymer with the resulting sludge being removed and transported to a disposal location. The clarified liquid would be returned to the spoil area or the dredge site. In an optional step, the digested sludge may be dewatered.

The aforementioned methodology will work quite well on canals, and on any body of water that can easily be isolated and sectioned off from larger waterways. For those bodies of water that cannot be isolated, such as the channels of a river, treatment would occur after the water and sludge have been pumped to the spoil area. The sludge and wastewater may be retained in an above-ground tank or vessel and aerated and mixed to support specially propagated aerobic bacteria. Aeration and mixing of the organic sludge with the bacteria would continue until the organics have been consumed, which could readily be confirmed through the use of analysis of dissolved oxygen and BOD analysis of the material. After it has been determined that the organics have been consumed, the digested sludge would undergo clarification facilitated through use of polymer with the resulting sludge being removed and transported to a disposal location. The clarified liquid would be returned to the spoil area or the dredge site. In and optional step, the digested sludge may be dewatered.

Treatment could readily occur at a spoil area by dividing the spoil area into multiple areas, treating one at a time.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts and method steps may be resorted to without departing from the spirit and scope of the invention. Now that the invention has been described,

What is claimed is:

1. A method for treatment of agricultural animal wastewater, which comprises the following steps:

analyzing the characteristics of the wastewater and sludge to be treated in an animal wastewater lagoon;

identifying and propagating beneficial aerobic bacteria such that a selective dominance of the beneficial aerobic bacteria may be established in the animal wastewater lagoon;

sizing an aeration means according to the quantity of water to be treated;

aerating the animal wastewater lagoon and aerobically treating the wastewater in the animal wastewater lagoon further comprises propagated aerobic bacteria selected to aerobically digest organic material;

clarifying the wastewater by injecting the aerobically treated wastewater with a polymer, wherein during clarifying, solids settle to the bottom of the animal wastewater lagoon and clarified water remains.

2. A method according to claim 1 further comprising the step of after clarifying, diverting a portion of the precipitated solids to a dewatering means.

3. A method according to claim 1, wherein wastewater undergoes treatment in the aerobic lagoon for a period of several weeks.

* * * * *